(12) United States Patent
Hayosh

(10) Patent No.: US 6,600,823 B1
(45) Date of Patent: *Jul. 29, 2003

(54) APPARATUS AND METHOD FOR ENHANCING CHECK SECURITY

(75) Inventor: Thomas D. Hayosh, Bloomfield Hills, MI (US)

(73) Assignee: Unisys Corporation, Blue Bell, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,757

(22) Filed: Oct. 16, 1997

Related U.S. Application Data

(60) Provisional application No. 60/028,741, filed on Oct. 22, 1996.

(51) Int. Cl.[7] .............................. H04L 9/00; G09C 5/00
(52) U.S. Cl. ...................... 380/51; 713/170; 713/176; 713/179; 380/55
(58) Field of Search .......................... 380/54, 55, 51, 380/30, 23, 24, 3; 713/170, 176, 179; 705/60, 62, 63

(56) References Cited

U.S. PATENT DOCUMENTS

| | | | | |
|---|---|---|---|---|
| 4,725,718 A | * | 2/1988 | Sansone et al. | 235/495 |
| 4,806,740 A | * | 2/1989 | Gold et al. | 235/449 |
| 4,879,747 A | * | 11/1989 | Leighton et al. | 380/23 |

(List continued on next page.)

OTHER PUBLICATIONS

Schneier, "Applied Cryptography," 2nd Ed., Section 2.6, pp. 34–41, 1996.*
Freedman, The Computer Desktop Encyclopedia, 2nd ed., pp. 537 and 636, 1999.*
"Senate Banking, Housing and Urban Affairs Committee, Subcommittee on Financial Services and Technology, Hearing on Electron Authentication and Digital Signature," Oct. 28, 1997, p. 1–8, http://www.senate.gov/~banking/97_10hrg/102897/witness/mossburg.htm.
"Frequently Asked Questions Regarding Digital Signatures, "p. 1–3, http://www.commerce.state.ut.us/web/commerce/digsig/dsfaq.htm.

*Primary Examiner*—Gilberto Barron, Jr.
*Assistant Examiner*—Stephen Kabakoff
(74) *Attorney, Agent, or Firm*—David G. Rasmussen; Mark T. Starr

(57) ABSTRACT

The invention is a method for creating a self-authenticating value document at a senders location and for verifying it at a receivers location. At the senders location a document is created having a machine readable data field, a taggant containing extractable first tag data, and a storage medium with clear text data and the first tag data extracted from said taggant written on it. The clear text, first tag data and data from a machine readable data field collectively make up a document message. The document message is hashed with a hashing algorithm to create a first message digest. The first message digest is digitally signed with a private key to create a digital signature which is written on the storage medium in addition with the clear text data, and the first tag data.

To verify the authenticity of the self-authenticating value document at the receivers location the machine readable data field is read and the storage medium containing the clear text data, first tag data, and a digital signature is also read. A document message is created from the extracted clear text data, the first tag data, and the machine readable data. The document message is then hashed with a hashing algorithm to create a second message digest. A public key is applied to the digital signature using a known algorithm to re-create the first message digest. The first message digest is then compared with the second message digest to authenticate the holder of the private key and prove the integrity of said machine readable data field and the data read from the said storage medium to provide a first level of security.

41 Claims, 8 Drawing Sheets

U.S. PATENT DOCUMENTS

| | | | | |
|---|---|---|---|---|
| 4,985,614 A | * | 1/1991 | Pease et al. | 235/440 |
| 5,190,318 A | * | 3/1993 | Mantegazza | 283/82 |
| 5,341,428 A | * | 8/1994 | Schatz | 380/23 |
| 5,355,411 A | * | 10/1994 | MacDonald | 380/23 |
| 5,371,798 A | * | 12/1994 | McWhortor | 380/51 |
| 5,384,846 A | * | 1/1995 | Berson et al. | 380/23 |
| 5,469,506 A | * | 11/1995 | Berson et al. | 713/186 |
| 5,475,205 A | * | 12/1995 | Behm et al. | 235/375 |
| 5,509,692 A | * | 4/1996 | Oz | 283/70 |
| 5,535,078 A | * | 7/1996 | Warwick | 360/119 |
| 5,737,886 A | * | 4/1998 | Kruckemeyer | 283/67 |
| 5,740,244 A | * | 4/1998 | Indeck et al. | 380/4 |
| 5,742,685 A | * | 4/1998 | Berson et al. | 713/186 |
| 5,799,092 A | * | 8/1998 | Kristol et al. | 380/51 |
| 5,818,955 A | * | 10/1998 | Smithies et al. | 382/115 |
| 5,936,865 A | * | 8/1999 | Pintsov et al. | 700/107 |
| 5,974,147 A | * | 10/1999 | Cordery et al. | 705/62 |
| 6,003,763 A | * | 12/1999 | Gallagher et al. | 235/370 |
| 6,030,001 A | * | 2/2000 | Kruckemeyer | 283/70 |
| 6,038,666 A | * | 3/2000 | Hsu et al. | 713/186 |
| 6,064,993 A | * | 5/2000 | Ryan, Jr. | 705/403 |
| 6,073,121 A | * | 6/2000 | Ramzy | 705/45 |
| 6,112,193 A | * | 8/2000 | Dlugos et al. | 705/408 |
| 6,170,744 B1 | * | 1/2001 | Lee et al. | 235/380 |
| 6,212,504 B1 | * | 4/2001 | Hayosh | 705/64 |
| 6,233,340 B1 | * | 5/2001 | Sandru | 380/51 |

\* cited by examiner

Typical Check with Self–Authentication Stripes on Back of Check

*Basic Block Diagram of Demo System*

*Digital Representation of a Portion of a Taggant Pattern*

TAGGANT FROM CHECK 1270 FROM READER #1
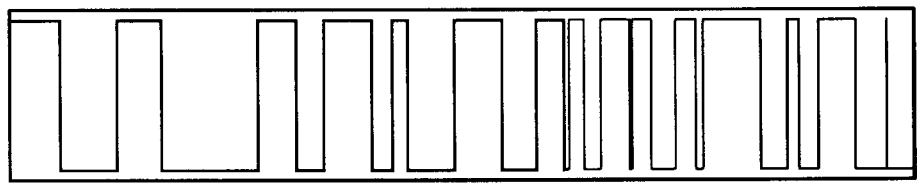
TAGGANT FROM CHECK 1270 FROM READER #2
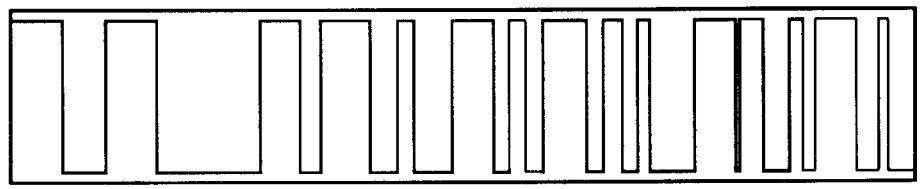
ERROR METRIC: 0.1622
*Figure 6A*
*Comparison of Same Check Taggant as Read on Different Readers*
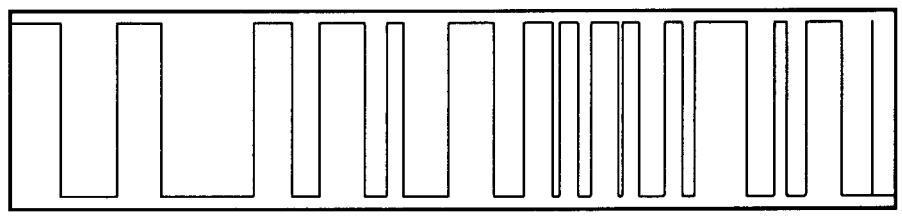
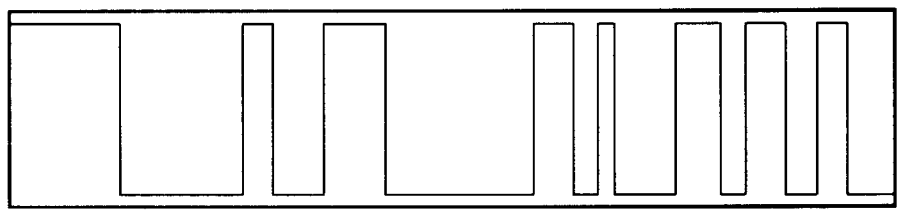
ERROR METRIC: 0.395
*Figure 6B*
*Comparison of Different Checks Read in Different Readers*

Taggant Patterns
*Same Document Read in the Same Reader*
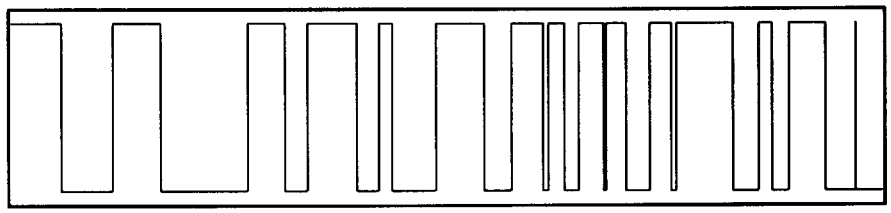
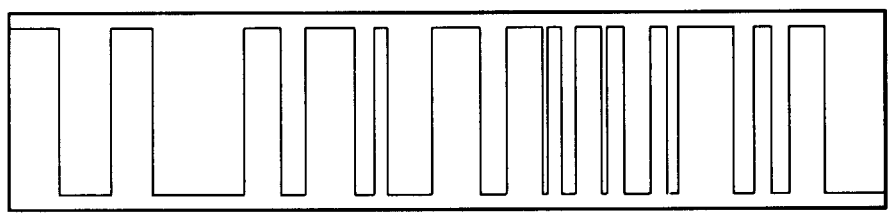
Figure 6C     ERROR METRIC: 0.0393
TAGGANT FROM CHECK 1270 FROM READER #1
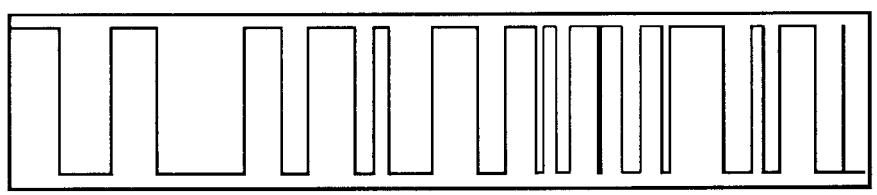
TAGGANT FROM CHECK 1271 ON READER #1
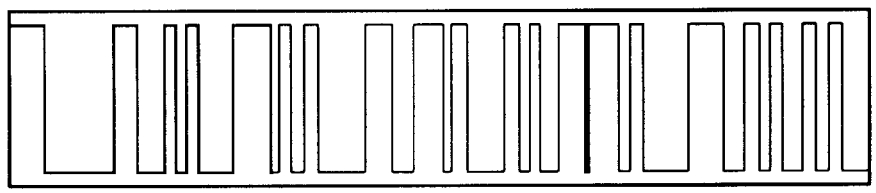
Figure 7     ERROR METRIC: 0.3684
*Comparison of Different Check Taggants in the Same Reader*

Self-Authenticating a Check or other Document
First Step — Printing the Basic Document Form

Self-Authenticating a Check or other Document
Second Step — Personalization Printing & Reading/writing

APPARATUS AND METHOD FOR ENHANCING CHECK SECURITY

This is based upon my U.S. Provisional filing Ser. No. 60/028,741 filed Oct. 22, 1996 and claims priority therefrom, under 35 USC and '37CFR1.78. This relates to enhancing the security of checks, or like "value items".

BACKGROUND, FEATURES

Workers in the art of handling checks and the like are well aware that fraud is a growing concern; check fraud due to counterfeiting in 1996 will approximate $4.3 B (Nilson Report, with losses 10% Banks—90% Merchants). Experts know that counterfeit identification is easily procured.

To prevent fraud it is critical to distinguish an authentic document from a counterfeit or altered document. Current technologies rely on difficult-to-print human detectable features which are added to a document to prevent illegal reproduction. Fraud detection is accomplished by human observation and is based upon the examiner's knowledge, experience and time allotted for examination of a document.

Another approach to increasing security of a value document is to add a unique property to each document. Data about that property is encoded on the document itself and is secured using a public key based digital signature. In such a scheme, machine verification of authenticity is possible.

This invention uses a unique property of magnetic ink printing on a check: magnetic remanence variation, that provides for self-authentication when used with a recordable magnetic stripe on the check for storing a digital signature and other document data.

A "value document" will be understood as representing negotiability (e.g. currency which is highly negotiable). A value document may have limited negotiability; for example, a birth certificate is not negotiable but has value. Regardless of the limits of negotiability, fraudulent value documents increasingly threaten the integrity of our conventional business practices. In many instances where paper value documents are used there is a move to convert those transactions to completely electronic transactions (e.g. electronic funds transfer, though it needs improved security and resistance to fraud, can reduce the cost of commercial transactions by eliminating the handling of paper, cash and checks—but electronic transactions may prove to be more prone to fraud than paper documents).

Traditionally, the authenticity of a document is determined by physical examination for color, background printing, paper texture, printing resolution, and ink characteristics. On an initial level, there may be numerous security features present in a value document but few if any, can be detected and evaluated by the untrained individual. Because security features are normally not standardized except in currency, training tellers and cashiers to do extensive security evaluation is not practical, even though these are often the only people who get the chance to closely examine the document in a payment system which is "back-end automated".

Here one may assume that "value documents" comprise commercial and personal checks, although the concepts presented here can easily be applied to travelers cheques, credit cards, event tickets, passports, driver's licenses, motor vehicle titles, and even currency.

According to the July 1995 Nilson Report, the volume of paper checks written in the United States in 1994 was $61 billion U.S. dollars: 57%, or $34.8 billion were personal checks, 40%, or $24.4 billion, were commercial checks and 3%, or $1.8 billion, were cheeks written by the government. In that same Nilson Report, fraud losses from all checks totaled $12.6 Billion, with losses to merchants of $11.26 Billion, while financial institutions lost another $1.34 Billion. Types of check fraud included:

Accounts closed and kiting—32%
Counterfeiting—27%
Forgery—24%
Bankruptcy—12%
Refer to maker—5%

In working on measurement of unique magnetic signal properties of Magnetic Ink Character Recognition (MICR) characters of checks, I noted that magnetic remanence variation quite often presented a large distortion in MICR waveforms. I noted that the magnetic remanence variation was reproducible when read by a read system with a given bandwidth proportional to document speed. A system concept came to mind that correlated the magnetic remanence variation of the left-most Routing Transit symbol to a value stored in a data base. The data base could be queried, using the MICR line itself as the index, and the previously noted remanence variation could be compared with the subsequent measured variation. This "FIRST method", although technically feasible when the MICR readers had the same physical spatial and electronic proportional bandwidth, was not preferred, as a potential product, because of the necessary large "all-items" data base requirements. There were some limited applications such as credit cards where this can be feasible, but the credit card market is moving to "smart cards" as a way to reduce fraud. And a market survey indicated that credit card issuers were reluctant to invest in new technology to further improve "magnetic stripe technology".

When I contemplated, methods for authenticating value documents, I realized that the methods should not have the limitation of requiring an "all-items data base" to perform authentication. I began to realize that one could use a recordable data file for storing an "encrypted" message, or a "digital signature", using "public key technology."

Encryption

One may assume that an "encrypted digital signature" is a kind of "electronic fingerprint" that only a legitimate sender can add to electronic mail (e.g. e-mail).

Workers are aware of encryption "keys", or mathematical functions by which unencrypted characters are transformed into code, e.g. a message sender and receiver may agree on a secret code (key) to encrypt and decrypt a message—a system as simple as substituting the letter B for the letter A, C for B, D for C an so on. The recipient reverses the procedure to decrypt and read the so—encoded message.

This gives rise to "public key cryptography" where each user has two "keys": the public key which is disseminated widely and used by others to encrypt their messages to you, but which is decoded only with a matching "private key", kept secret (e.g. guarded by a password an a user's computer) and used to decode the public key message into clear text. Using "one-way functions", this public/private key system is quite secure—these functions being easy to perform in one direction but very, very difficult to perform in the opposite direction without the secret private-key information. Thus once you've successfully installed the software and created a pair of keys, turning an e-mail message into pages of nonsense is as easy as clicking on an icon depicting a padlock on an envelope. Clicking a second icon adds an encrypted digital signature, proving that you wrote the message. You can then safely send the message over the Internet.

Except for one problem. Your recipient must also have Pretty Good Privacy (PGP) compatible encryption software—and that person must have already supplied you with his or her public key. Without the recipient's public key, there's no way to encode the message to him or her. Likewise, the other party will need your public key before he or she can encrypt a reply. Swapping keys is a simple matter, but ensuring that your correspondent has the necessary software isn't.

That's why encrypted e-mail is expected to get a big boost from the latest generation of Web browsers, which have built public-key cryptography into their e-mail utilities.

But, in an improved method, the sender also sets up a "digital certificate". By handing someone his digital certificate, he's giving them his public key. (e.g. this added integration in a Netscape browser means that when you receive an e-mail with someone else's certificate attached, it automatically gets added to a database on your PC, ready for use when you want to send that person an encoded message).

The certificate concept is meant to emphasize proof-of-identity. Certificates can be endorsed by a third party, a so-called trusted entity that guarantees certain information. Netscape users in search of a certificate will find themselves directed to a Web site like that of VeriSign, where users can obtain digital ID cards with varying levels of assurance of the person's true identity—and pay for the privilege.

Assume a check proceeding from a merchant (e.g., exchange for goods purchased) to a Bank of FD (first deposit) and to an On-us Bank, (the paying Bank) in the course of normal dealings is "forward presented", with a typical "return time", if the check is not paid, being 2–7 days. By contrast, with my "self-authentication" as here described, this 2–7 days is cut to a few seconds or minutes, using my preferred "self-authentication module" as described below (and see FIG. 8). For such "value items" (documents etc., that represent value) it is often desired to provide an easy and economical method to authenticate that the document is an original and genuine (i.e., not a counterfeit—e.g., that a check is "good", or that a contract was really approved and signed as shown, or that a letter is really signed by its apparent author). Such documents, or other value-items, may take the form of a check, or drivers license, or motor vehicle title, birth certificate, passport, credit or debit card, merchandise or even currency. In addition, for merchandise (manufactured items) it is often desirable to trace the origin of manufacture where counterfeiting is suspected. The genuine article may have experienced special invisible processes which affect the suitability of use, but a counterfeit item may look identical under casual examination, yet may not work properly. An example of this is replacement parts for aircraft. Such parts or components must often be "certified" to assure that they meet special requirements or have undergone a certain mode of manufacture; for example, that a part was treated to impart high strength under stress loading or high temperature, etc. A "counterfeit component" which is not properly so heat-treated may fail in use and cause an aircraft to crash. In such cases it is critical that verifiably genuine parts be installed during aircraft maintenance.

As a solution to this problem, I here propose a security algorithm that is based on some physical parameter of an item (e.g., printing on a check). I then encrypt a digital representation of it, and then print the encrypted data on the item so as to be machine read. In many cases, I prefer to use a "public key" (e.g., at the Point of Sale (POS) to decrypt the encrypted value and compare, to assure that the proper code is present.

One preferred solution involves a technique for applying a "digital signature" to a "value document" for self-authentication, using particular encryption algorithms, e.g., for checks at the "point-of-sale" POS, and at the "Bank of first deposit" so as to detect counterfeits early.

I here teach a technique for document self-authentication, using a correlation between a document characteristic and a related "digital signature" used therewith (e.g., as a method for tagging checks, etc.),—this done in a fashion that facilitates machine-reading and authentication, without need for a skilled document examiner: my technique preferably also permits remote capture of a document image with confidence in the authenticity of the scanned, imaged document. I prefer to do this with a "two key" (public, private key) digital signature method—especially using a representation of a magnetic characteristic of the document (e.g., remanant magnetic variation pattern placed on a target-site on the document). This is to be machine read and encoded and encrypted with the two-key algorithm. The result is a machine-readable, encrypted version that may be sent to a document-recipient (e.g. bank)—which may decrypt/decode the data and compare it with known standards. A match assures authenticity.

Less Preferred Techniques

One method for enhancing document security involves the use of special paper and the printing of "security features" on that paper, so that when a trained person performs a visual examination he may be able to reliably decide whether the document in question is authentic or fraudulent. Often the acceptor of a "value document" is not adequately trained or skilled—and so may inadvertently accept a counterfeit item.

In other cases personal identification is used to authenticate a person for receiving a benefit or to control liability; for instance, when a bartender verifies that a person is of legal age before being served alcohol. With advanced printing technology now so readily available, examination of printing alone is inadequate to authenticate documents. A traditional method is to physically mark a document or like medium with a seal or signature. But these methods do not permit "remote" authentication (i.e., at a distance physically from the document) or by persons unfamiliar with the maker's seal or the signer's signature.

My solution is to devise a special machine-readable code (M-code), based on an item characteristic (e.g., magnetic feature of check printing), apply it to a subject check or other item (e.g., during item preparation) along with a second machine-readable authentication code (A-code), generated by modifying (encrypting) the M-code with a "private key encryption code" (devised from a two-key set: a "private key" used in the writing, and a "public key" used by the recipient to authenticate). Alternatively, the use of a "digital signature" replaces the straight encryption and provides a greater resistance to tampering than encryption/decryption.

Thus, an object hereof is to address (at least some of) the mentioned problems and to provide (at least some of) the mentioned features.

The methods and means discussed herein will be generally understood as constructed and operating as presently known in the art, except where otherwise specified; and with all materials, methods, devices and apparatus herein understood as being implemented by known expedients according to present good practice.

BRIEF DESCRIPTION OF THE DRAWINGS

These and other features of advantage of the present invention will be appreciated by workers as they become better understood by reference to the following detailed descriptions of past and present preferred embodiments which should be considered in conjunction with the accompanying drawings, wherein like reference symbols denote like elements:

FIG. 1 is a "sample check" according to an embodiment in preliminary form, while

FIG. 6A is a comparison of taggant patterns read from a single check as read on two different readers;

FIG. 6B compares the taggant patterns from different checks as read on different readers FIG. 6C compares the taggant patterns for the same check as read in the same reader;

FIG. 7 compares the taggant patterns from different checks as read in the same reader;

MAGNETIC TAGGANT

Figure 1:
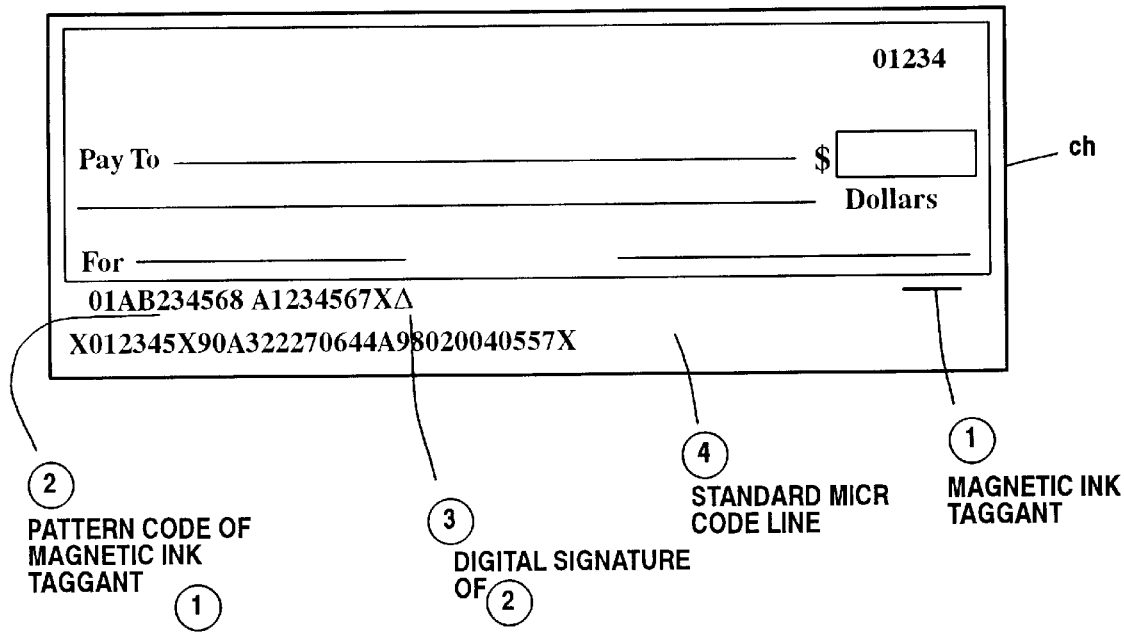

A taggant added to an item can impart a special property (e.g. magnetic remanence) which can be sensed or detected, usually without destruction. A preferred taggant here will impart a measurable random physical characteristic which, like magnetic remanence (as used here) can generate a random code from one taggant to another. Here, assume the taggant is incorporated in magnetically-loaded print-ink with random particle placement. One example of a taggant is a fluorescent coating, which may be essentially invisible to the eye unless it is excited with UV light, whereupon the coating fluoresces to emit light of another wavelength, (usually longer, than the wavelength of the exciting energy). It is desirable to have the preferred taggant supply more information than merely its presence. The additional ability to contain randomness or uniqueness is a feature of a "good" preferred taggant. Magnetics offers the capability of containing a magnetic signature in a very small portion of magnetic ink based upon the variability of magnetic remanence using traditional printing processes. All permanent (hard) magnetic materials exhibit magnetic hysteresis. Hysteresis refers to the lag in the build-up and fall-off of magnetic induction when a magnetic material is subject to a changing magnetic field. If the magnetic induction, B, is plotted against the value of the magnetizing field, H, a closed-loop (B/H) "hysteresis" curve is formed. The information contained in a hysteresis loop is useful in measuring and defining specifications for magnetic material. Magnetic remanence is the residual induction (flux density) which remains in a magnetic material when a magnetizing field is reduced to zero from a value which was sufficient to saturate the material.

To those skilled in the art, other physical properties of small physical particles may be used to provide a unique and random code. For instance, particles may fluoresce at one detectable wavelength when excited at another. Particles may absorb or reflect electromagnetic energy at certain RF or microwave wavelengths. Particles of sizes which are most effective at producing a large and repeatable random code when mixed with ink for printing are usually in the range of 5 to 100 microns. Particles which are too small tend to become homogeneous as they are dispersed in a liquid or paste, whereas those particles which are wider than they are long or thick tend to be dispersed in a more noticeably random manner which produces a noise-like signal which is repeatable when making subsequent scans across the printed region. I favor magnetic ink for printing MICR characters which contains iron oxide in about 50 to 70% concentrations by volume in an ink mixture. Deliberately larger magnetic remanence variations may be obtained by using magnetic iron oxide concentrations which are in the range of 20 to 50% concentration by volume.

Since the early days of wire and tape recording, magnetic coatings, when they were DC magnetized, have been known to be "noisy" such that their usefulness in that mode has been limited, unless an AC bias or carrier modulation scheme is used to improve the signal to noise ratio of the system. The noise is really a non-uniformity of the magnetic remanence as a function of position along the wire or tape. Experiments have shown that the noise pattern is reproducible since the pattern is characteristic of the media itself.

I have used demonstration checks (see FIGS. 1–3) to prove technical feasibility for using a taggant printed with a MICR magnetic ink wherein the random unique pattern is determined by the random orientation of the magnetic vectors of individual domains of magnetic material. Evidence exists that, in the demagnetized condition, there is not a complete cancellation of magnetic vectors; hence a small "micro-field" remains in the ink printing which gives a background or inherent noise level and consequently sets the dynamic range for a magnetic medium. Using larger particles and a lower concentration of magnetic material per unit volume produce the most modulation noise. When demagnetized, the separate magnetic particles are conventionally thought to be irregularly distributed. However, when magnetically saturated, they cluster together and tend to be magnetically grouped into dipoles of appreciable volume; thus a deeper micro-magnetic field is imparted, causing substantial magnetic noise.

The principle I use here is based on magnetic remanence variation and the fact that this characteristic is repeatable even after the taggant is demagnetized and saturation-magnetized again. There are certain ink formulations which enhance the forming of strong magnetic clusters and so improve the reliability of taggant coding; these are preferred.

Figure 5:
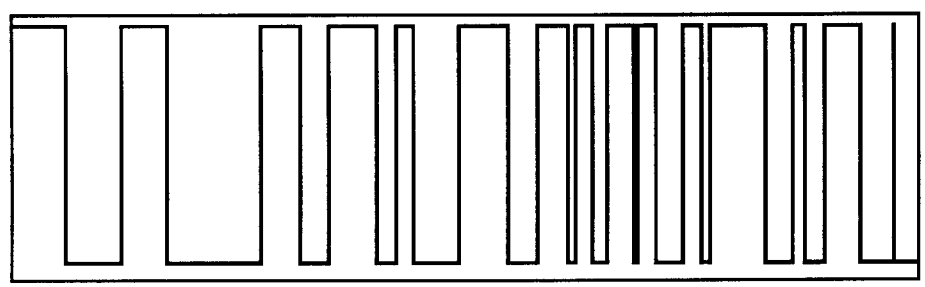
FIG. 5 is a digital representation of part of a related "Taggant pattern"
Figure 8:
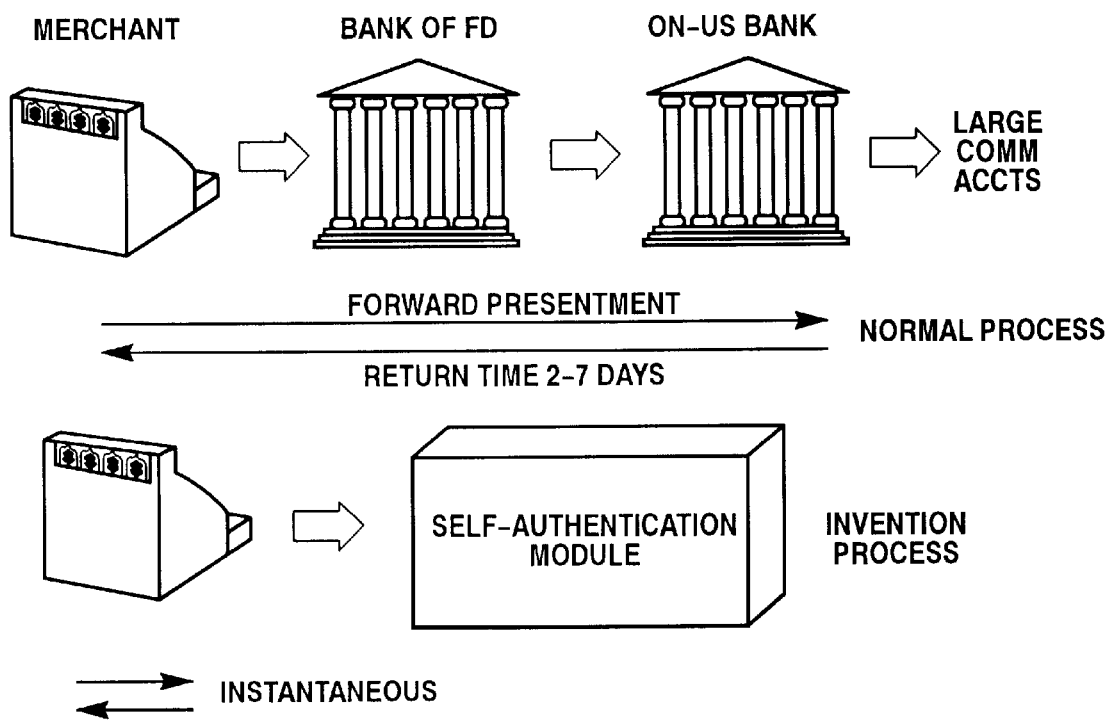
FIG. 8 functionally depicts benefits of authentication.

The technology for "reading" the magnetic taggant field uses traditional credit card write heads and read heads, having gap widths on the order of 0.5 mils. The signal, as read from the DC magnetized taggant stripe, is quite "noisy", having a spatial frequency spectrum which contains noise components ranging from magnetic domain boundaries frequencies all the way out to slow variations due to ink thickness changes. The spatial wavelengths which range from 5 micrometers to about 500 micrometers and generate noise due to both micro and macro effects. For purposes of limiting the data and promoting reproducibility, the preferred versions utilize the macro spatial wavelength frequency band from 50 to 500 micrometers for capturing magnetic remanence variations. (also see FIGS. 5–7, discussed below)

Digital Data File

A recording stripe which contains the coded data that I want to use for authentication is expected to use "medium coercivity" ink (of about 750 Oersteds) to improve its resistance to casual erasure in the normal handling of the document. It is anticipated that the taggant and the recordable stripe will be made from the same magnetic ink to reduce the cost of application by the document printer, See FIG. 3 for the dimensions and positioning of the magnetic tag and recordable data stripes S' and S, respectively on a typical check. For a demonstration system, test checks were printed using conventional magnetic ink having a coercivity of about 350 Oersteds.

The recordable stripe S,-(e.g. FIG. 3) is preferably recorded at a bit density of 350 bits/inch using an encoding technique known as "two-frequency, coherent phase" recording (or F2F). This method allows for serial recording of self-clocking data using one channel. [See ANSI X4.16-1983, American National Standard for financial services—financial services—financial transaction cards—magnetic stripe encoding].

The data is comprised of data bits and clocking bits together. An intermediate flux transition occurring between clocking transitions signifies a ONE; whereas the absence of an intermediate flux transition signifies a ZERO. The length of the recordable stripe on the check example permits up to about 185 bytes (1487 bits) of data to be stored. The data is preferably allocated as follows:

1st 50 bits: Synchronizing ZERO bits byte 0—: Start sentinel byte: Hex 02 byte 1–2: Total number of significant bytes of data (excludes synchronizing bits)

byte 3–4: Version and type of document codes byte 5–12: Key identifier field, a serial number link to a certified public key byte 13–14: Track speed estimate based on the total number of tag sample clocks byte 15–72: Taggant data byte 73–168: Digital signature (768 bits)

byte 169–185: Error correction code

All remaining space on the recordable stripe is filled with trailing ZERO bits. Unlike the data stripe on a credit card which can be read from left to right as well as from right to left, checks and similar documents are usually read only from right to left.

Digitally Signing a Document

Figure 4:
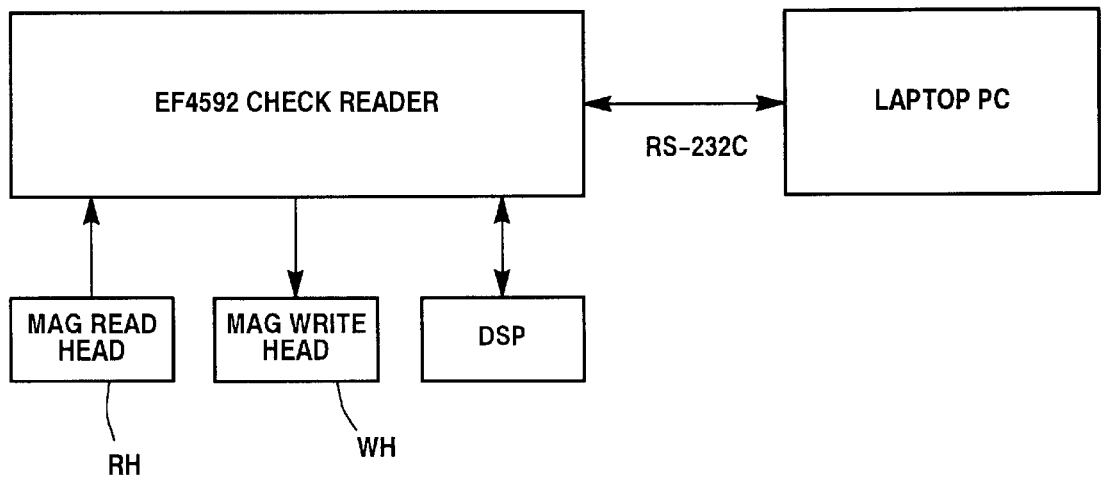
FIG. 4 is a block diagram of a related preferred self-authentication system.

"Digitally signing" a value document (e.g. a check), requires two passes through a modified EF 4592 check reader. In my prototype, only one check was digitally signed at a time. See FIG. 4 for a block diagram of a demonstration system.

Here, assume a Visual C++ application program running on a laptop PC computer and communicating, via a bidirectional RS-232 interface, to determine the control and operation of an EF 4592 check reader. On the first document pass, the magnetic taggant stripe is "saturation-magnetized" to erase any potentially fraudulently recorded data on the taggant stripe. This magnetization then sets up a uniform magnetization vector with the north pole at the taggant's stripe leading edge. Following magnetization, the taggant stripe is magnetically read with a credit card type read head RH and the analog signal is amplified and processed through a high-pass filter. This filter removes any dc bias and low frequency modulation, thus leaving magnetic particle magnetic remanence modulation within the spatial wavelengths of 50 to 500 micrometers. The resulting signal is then processed by a zero threshold level detector to determine the time interval that the signal spends above and below zero volts. See FIG. 5 for a typical taggant digital signal pattern after it has been so thresholded. A high frequency clock from the document signal processor (DSP, FIG. 4) is gated by the signal's time interval above zero threshold through one counter, while a second counter is gated by the time interval that the signal is below the zero threshold. The counts are stored, reset, counted, and stored again for 30 transitions to yield a basic pattern code which is sufficiently unique and random. The count data preferably takes the form of hex numbers from 000 to FFF. The count data alternates from count of time samples above zero to count of time samples below zero, etc. until approximately 30 transitions are detected.

The taggant count data and the MICR code line data are sent via the RS-232 connection to the PC which then calculates the required data; then this is recorded on the recordable stripe on the check. The data includes a "digital signature" computed using the "private key" that is associated with the account number/bank number of the document. The recorded data includes the 768-bit RSA digital signature of the MICR code line data, the taggant data, and miscellaneous data incorporating the "MD5 hashing algorithm", as well as other clear data fields as previously defined.

When the PC has computed the data to be recorded on the recordable stripe, the operator is instructed to insert the same document again into the check reader (input hopper). The recordable magnetic stripe will now be written with the required data using the same write head as was used to dc saturate magnetize the taggant stripe on the first pass of the digital signing cycle. Re-reading of the MICR code line will provide assurances that the correct document was inserted and that the appropriate data was recorded. Reading of the just written data may also be done to provide quality control assurance, (this is readily done in this pass, since the read head is positioned downstream of the write head).

The EF 4592 check reader will exhibit two document sensors; an input sensor that detects the presence of a document in its input hopper and causes the drive motor to start; and an exit sensor that is located just upstream of the MICR magnetic read head. The magnetic write head is located such that its write gap is less than 0.500 inch to the left of the exit sensor. The magnetic read head used for sensing taggant data and recorded data is located such that its read gap is located less than 0.500 inch to the right of the exit sensor.

Authenticating a Document

A second mode of operation of the above (demonstration) system is as a reader to perform "authentication". Multiple documents may be authenticated one after the other based on the PC's ability to perform the look-up of the appropriate public key, to perform the algorithmic computations for digital signature authentication and to make the comparison between the required data fields. The next document to be authenticated is not allowed to be driven in the reader transport until the laptop PC application gives a ready command.

The operation of the system is as follows: A document is inserted into the input hopper of the EF 4592 check reader, which has been initialized by the laptop PC application: the dc drive motor will start as the document is dropped in and the document activates the input document sensor. As the leading edge of document reaches the exit sensor, the strip write head WH saturate-magnetizes the magnetic taggant stripe; the MICR reader reads the code line; the remanence variation is then sensed by the stripe magnetic read head RH; and the data recorded on the recordable stripe is subsequently read and stored. Timing of these operations is based on the DSP which has been added to interface with the EF 4592 check reader. Note that the same magnetic read head is used for reading the taggant magnetic remanence pattern and the encoded data on the recordable stripe. The DSP also provides the capability to recover the F2F encoded data as received from the magnetic read head (which operates within the speed and data density parameters of this system).

Modifications of the RS-232 logic of the EF 4592 are made to allow all the data read from the taggant and the recordable stripe to be inserted in the RS-232 data stream at 19.2 Kbaud following the MICR code line data. This data is then sent to the laptop PC (application). Appropriate field delimiters separate the various data fields.

The following processes are performed by the application PC which is preferably running under Windows 95 (Pentium 100 Mhz PC laptop):

1. The PC application assesses the MICR code line to determine if the External Processing Code (EPC) characters, 90 are present which define this particular authentication system;
2. The PC application compares the taggant data which was "clear-encoded" in the recorded stripe with the just read taggant data and computes any error between the two, and then determines if the error is within, a (predetermined) acceptable limit;
3. The PC application uses the MICR code line data, the originally recorded taggant data, and the miscellaneous data as previously defined and assembles the data in a standard format;
4. The PC application uses the bank number and account number to perform a "file-lookup" to capture the "public key" belonging to that account holder, and then authenticates the key with a certificate which correlates the public key with a particular account holder;
5. The PC application uses the appropriate public key to perform authentication of the "digital signature" portion of the recorded stripe data;
6. And finally the PC application reports to the user the results of this self-Authentication analysis (e.g. as "authentic" or as "not-authentic", or "unknown").

Critical Factors

There are two critical success factors for proving technical feasibility here: a low false alarm rate and a low false accept rate. A false alarm is generated when a good document is not verified as being good. For a practical self-authentication check reader, the false alarm rate should be less than 1% on the first reading pass. Causes of false alarms could be lack of robustness of the taggant discrimination algorithm, excessive document skew as it is being read, or errors in reading the recordable data stripe. This factor for success is readily tested by reading the magnetic tags and digitally signing documents in one reader, and then performing "authentication" in two other reading devices. See FIG. 6 for a typical error metric of 0.1622 when reading the same check in different readers. When reading the same check in the same reader, the error metric is typically in the range of 0.0600.

FIG. 6B compares the taggant patterns for different checks as read in different readers yielding an error metric of 0.395.

FIG. 6C compares the taggant pattern for the same check read on the same reader yielding an error metric of 0.0393.

Testing results on the robustness of the taggant compare algorithm indicate that this factor for success will be met in virtually all cases.

FIG. 7 illustrates a typical error metric of 0.3684 when comparing the taggant patterns of two different checks and reading them in the same reader.

It is clear from my tests, that the taggant patterns are randomly different for checks which are printed serially one after another and using the same printing process. Therefore, a threshold value for the error metric can easily be set in the range of 0.25 to determine the authenticity of the read taggant with the originally read taggant pattern.

A "false accept" rate is generated when a counterfeit document is verified as being authentic. Practically, this rate should be much less than 1 per 10,000 documents. The principal cause of a high false accept rate could be inadequate uniqueness in the taggant code pattern. This success factor is not easily tested because of the large number of "deliberate counterfeit" attempts which would be needed.

Market

I emphasize the merits of my self-authentication system as applied to commercial checks. Other markets such as retail (personal) checks and government documents were also considered. The ability to uniquely identify a piece of paper through the "taggant" is a keystone of my self-authentication system. However, reading of the self-authentication data at the POS, bank of first deposit, and On-us bank is expected to be a larger issue than the printing because it involves multiple hardware manufacturers as well as multiple processing sites.

There are many applications which can use such self-authentication. For instance, low speed MICR reading devices can be more easily justified by increasing the number of applications used by the devices to include: the expansion of Electronic Check Presentment (ECP) techniques at the branch and POS; the capture of data on low speed MICR devices for the power encoding of checks downstream at the reader/sorter sites; and, of course, my self-authentication.

The use of self-authentication technology assists the use of image on high speed reader/sorters by addressing the issue of positively identifying a piece of paper for image interchange. The model assumes a low speed back room solution at low volumes which requires that self-authentication items be "out-sorted" from high speed equipment, then passed through a UNISYS DP500 (500 DPM class) reader equipped with a self-authentication reader. For higher volumes, appropriate classes and numbers of readers would have self-authentication readers installed. The corporate customer must be convinced to adopt the digital signing of checks in order for the self-authentication system to work best.

Method Steps

Figure 9:
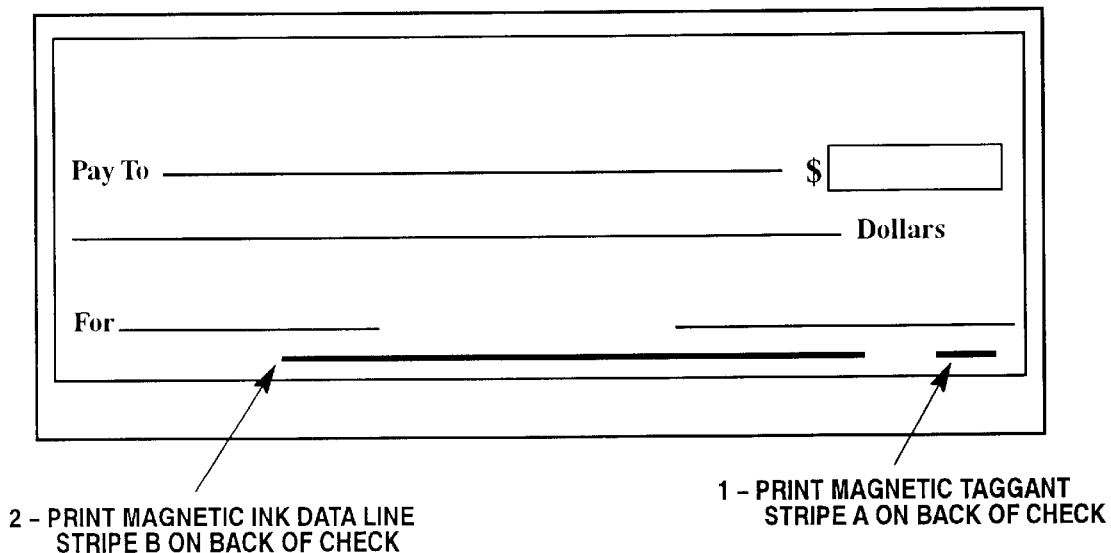
FIG. 9 illustrates the first step in producing a self-authenticating document which is printing a magnetic taggant strip and a longer magnetic stripe used for storing data.
Figure 10:
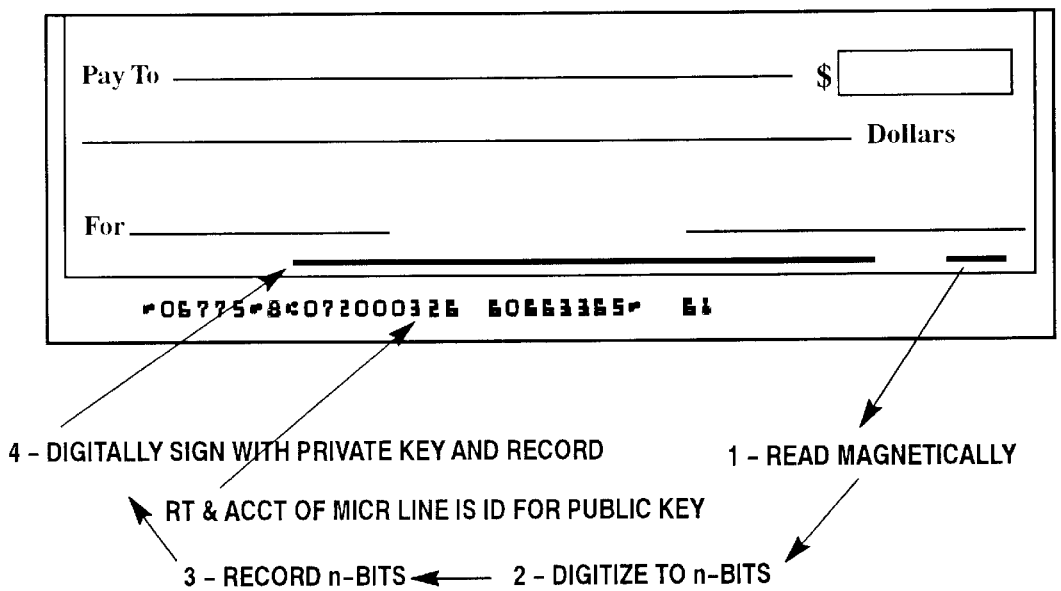
FIG. 10 illustrates step 2 in producing a self-authenticating document which is personalized printing, reading the taggant strip, S-1, coding the pattern from the magnetic remanence variation read, performing a digital signature computation, recording on the stripe, S-2, the taggant pattern data, other user data and the digital signature.
Figure 11:
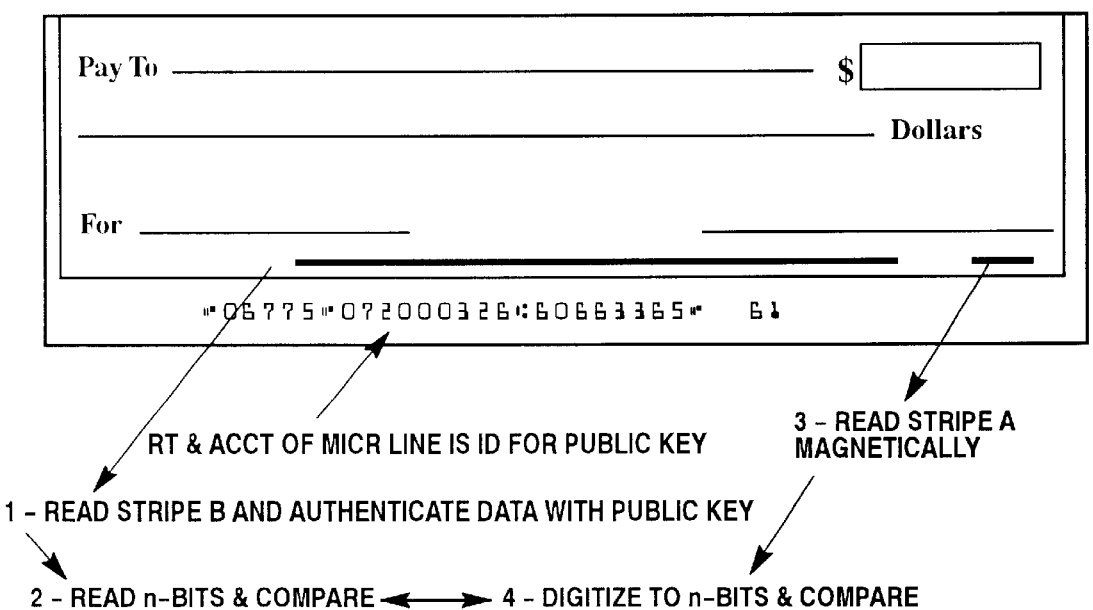
FIG. 11 illustrates step 3 in authenticating a self-authenticating document at a point of purchase or at a financial institution which includes the operations of involved in authenticating the document.

FIGS. 9–11 illustrate (simplified) how my self-authentication invention can advantageously be applied for check printing and processing, as follows:

Step 1; Print check: (FIG. 9) note magnetic ink data line (stripe B) and magnetic taggant (stripe A), both on reverse side (non-face side) of check;

Step 2: Then personalize printing (second pass), Read/Write (FIG. 10);

Step 2-1: Read taggant stripe A magnetically (taggant therein)

Step 2-2: Digitize this (to n bits)

Step 2-3: Make a file containing the n-bits corresponding to the taggant pattern.

Step 2-4: With application information such as version type, key identifier data, reader track speed, taggant pattern data, and MICR line data, create a message. Digitally sign this message and write parts of the message and the digital signature on stripe S-2.

Note; [MICR line gives RT; Account No. as ID for "public key"]

Step 3: Authentication at POS or bank (FIG. 11)

Step 3-1: Read stripe S-2 (Stripe B), extract data and digital signature. Using "public key" perform authentication of all other required data contained on S-2 as well as on MICR line.

Step 3-1A: separate the pattern data from the data stream which was read and verified from Step 3-1.

Step 3-2: Read stripe A magnetically

Step 3-2A: and digitize this to n-bits (as taggant pattern)

Step 3-3: compare n-bits of steps 3-1A, 3-2A; if the patterns match within an acceptable error bound, then the POS or fmancial institution performing has "authenticated" this item.

Here, "self-authentication" of a check will be understood as giving check data which can be verified as genuine and involving a "digital signature" which uses information on the check.

The Digital Signature used here allows a check writer or issuer to "digitally sign" a message representing a check feature (e.g. from the applied taggant), and allows another person to use the proper public key to verify the message and validate the identity of the check writer and the genuineness of the check.

Here, assume that "public keys" are based on the check-writer's ID (e.g. check no., account number).

So the steps above have:

The check printer or issuer using a taggant, digitally signs the check with a private key and includes taggant pattern data which produces a varying pattern from one check to another;

Then letting the check recipient (bank) authenticate using a public key to validate the digital signature. (including re-read taggant).

Ideal Check Security Parameters

Machine readable-highly secure resists tampering

At POS by merchant

At Bank of First Deposit

At "On-us" Bank before payment

Low printing cost

Low-cost reading and self-authenticating

Useable on a full range of transports

Can co-exist with visual alteration protection features

Enhances Financial Image Interchange

Applications

Checks

Magnetic stripe cards (credit/debit)

Passports (US and International)

Green cards, social security cards, birth certificates

Counterfeit currency detection

Drivers licenses, motor vehicle titles

Gift certificates, lottery tickets, etc.

Many other documents and other items (paintings, etc.)

Niche Markets

Motor Vehicle Titles

International Bills of Lading

Other Paper Based Systems that Seek the Advantages of Converting to Electronic Commerce FIG. 1 schematically depicts an exemplary check ch, marked with a proprietary magnetic ink taggant stripe 1, and having a corresponding pattern code 2 or "fingerprint" fP, corresponding to a certain proprietary characteristic of this taggant stripe, while also having a "digital signature" 3 corresponding to code 2. This check also exhibits a standard MICR code line 4 which contains Bank routing number and account number. The magnetic ink taggant stripe 1 may be placed in other various positions on the document (e.g. on rear face), as long as it is above MICR line 4 (a 0.625 inch clear band reserved only for MICR printing). The pattern code 2 (fingerprint number) and digital signature 3 may be printed with any machine readable font which allows assignment to a binary table.

Here, assume that Fingerprint" fP will be used as a check-identification number (e.g., converted to an 80-bit number)—as a salient feature hereof.

Here, we assume that the "digital signature" S of a number, e.g., h(M), is produced by multiplying h(M) by itself d times, then dividing by N.

Following are a few additional features of any "digital signature" scheme:

If any tiny piece of a message abc . . . changes, say to abd . . . instead of abc . . . , the signature will fail to verify. On the other hand, if a signature verifies, this is proof that absolutely nothing has changed since the message was originally signed.

Nothing can be inferred about the private key $k_{private}$ from knowledge of the corresponding public key $k_{public}$.

Thus, in RSA, (d, N) typically denotes a private key and (e, N) denotes a corresponding public key. The real secret number is d—this is the part of the private key that must be kept confidential. A signature on M in RSA is computed as $$s = h(M)^d \mod N.$$

(I.e., s is set equal to the number obtained when h(M) is raised to the d power and then divided by N. The signature s is equal to the remainder one gets when $h(M)^d$ is divided by N.). To verify an RSA signature s on M, one checks to see if $$h(M) = s^e \mod N$$

(This last equation says "raise s to the e power and find the remainder of $s^e$ when it is divided by N. This remainder should be equal to h(M).)

Figure 2:
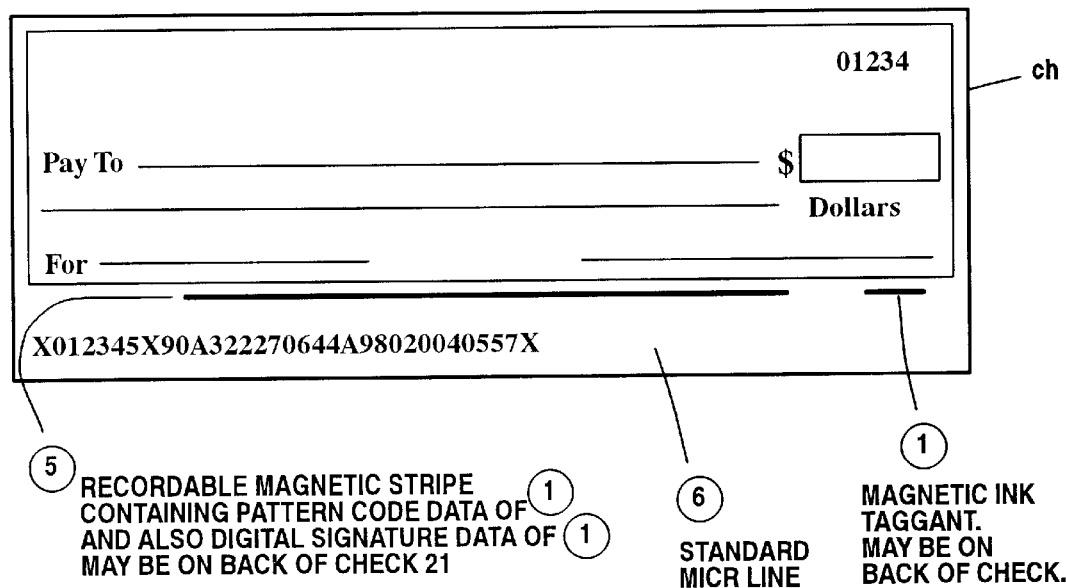
FIG. 2 shows the same, in "final form"
Figure 3:
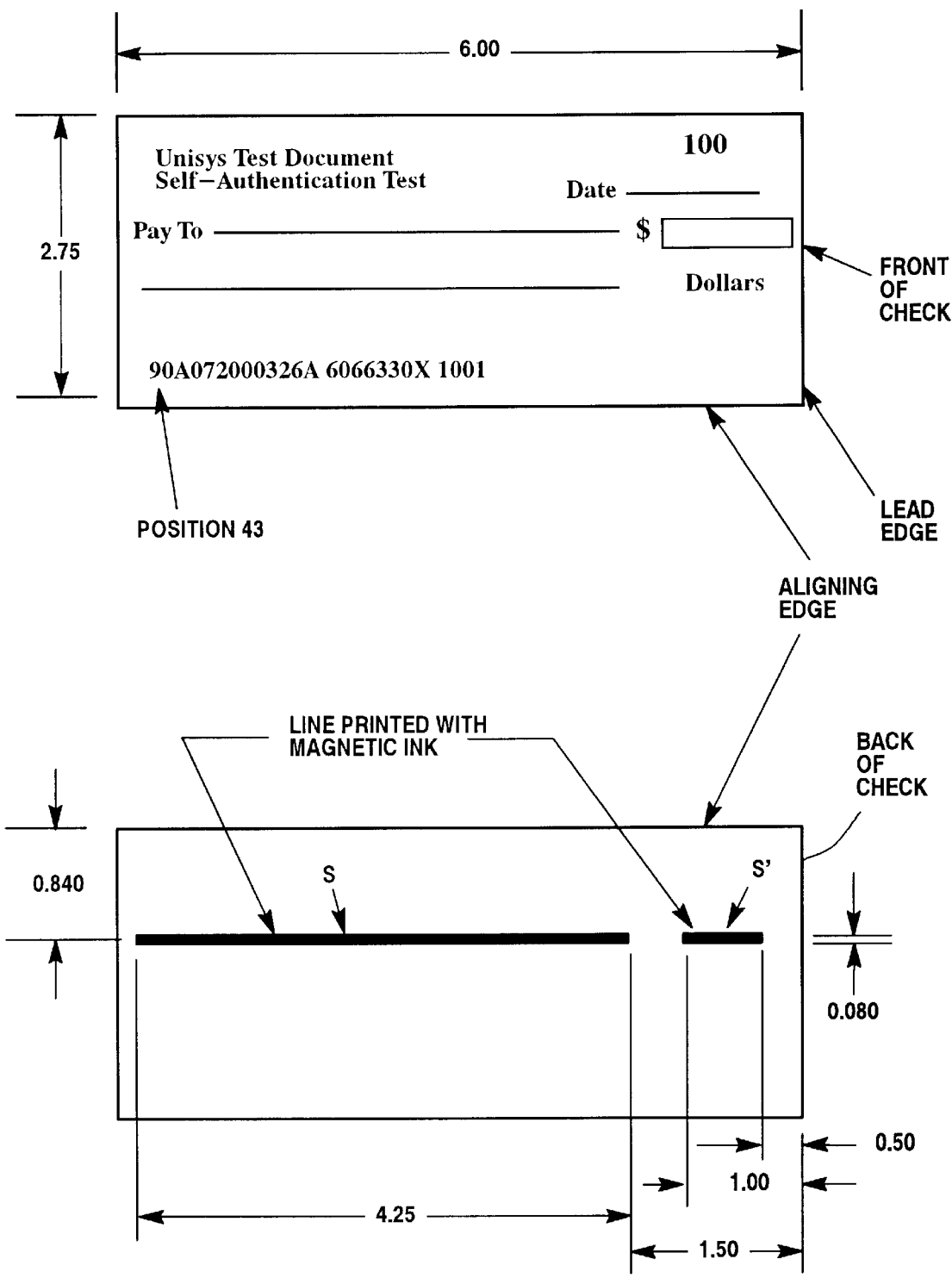
FIG. 3 depicts a typical check with "self authentication stripes"

FIG. 2 is similar (e.g., see taggant stripe 1), but also has a machine-readable magnetic stripe 5 containing pattern code data corresponding to magnetic ink taggant stripe 1 and also including data corresponding to digital signature 3; The recordable stripe 5 and magnetic ink taggant stripe 1 may be located in various other places on a document. For checks it may be convenient to place the taggant stripe 1 and recordable stripe 5 on the back-face of a check so as to minimize the impact on present check designs.

I have invented a method which uses a random, variable, machine-readable code which is applied to a document, or other medium, during printing (or during another manufacturing process), as well as a machine-readable item authentication code (IAC) which is generated by using the preprinted random or applied code and encrypting this code with an encryption key that belongs to a set of two associated digital cryptographic keys—a scheme called "public key encryption", where one of the keys is a "private key" and the other a "public key". The private key is kept confidential and used to encrypt the message which is being sent. The public key is widely published and used by the message recipient to verify its authorship.

The public key for a particular owner or printer of a security document would be registered by a digital certificate authority who would take the necessary steps to conduct background checks on the user to see that the assignee of a public key is who he says he is. Using a digital signature, via this two-key method, can assure the identity of an author of a message via E-mail or of the purchaser-check drawer of goods over a public communication network.

Such a key pair is tied to a user's name or identification account number (e.g., with other identifying information). The problem of authenticating electronic messages sent over public networks was addressed theoretically in 1976 by Whitfield Diffie and Martin Hellman when they published their ideas for exchanging secret messages without exchanging the secret keys. The idea came into fruition in 1977 with the invention of the "RSA Public Key Cryptosystem" by Ronald Rivest, Adi Shamir, and Len Adleman, then professors at MIT (Mass. Institute of Technology). Rather than using the same key to both encrypt and decrypt the data, the RSA system uses a matched pair of encryption and decryption keys. Each key performs a one-way transformation on the data representing a message. Each key is the inverse function of the other; what one does, only the other key can undo.

The "RSA public key" is, conventionally, made publicly available by its owner, while the "private key" is kept secret. To send a private message, an author scrambles the message with his "private key" and scrambles it again with the "public key" of the intended recipient. Once so encoded, his message can be decoded and read only by using the corresponding "public key" of the author and the "private key" of the recipient.

As an alternative (to provide authentication), a "digital signature" may be created by running the message data means through a "hashing algorithm" thereby creating a "message digest". The message digest is then encrypted using the private key of the person sending the message to thereby turn the digest into a "digital signature". The digital signature can be decoded completely only by someone who has use of the public key which matches the private key.

The message data is sent and hashed using the same algorithm as originally used; this is decoded using the public key, thus creating a new message digest which is then compared to the original message digest. If they match, the message has been verified as being sent by the expected originator and has not been tampered with.

For electronic authentication to "self-authenticate" an item (e.g., image of a document), the message data, as represented by the random code of a marked (tag) pattern, is hashed to produce a "message digest"; this is then encrypted using the private key of the item owner. This resultant encrypted message digest is then impressed on the item (i.e., on its screen-image) in a machine-readable form. In use, the item is scanned and machine read to extract the random printed marking code (e.g., magnetic. tag pattern), the identification data (e.g., account No.) and other machine readable data, as well as the printed digital signature.

These three data forms are then sent electronically to a remote receiver. The receiver uses the identification data to query a public key database for the associated public key—which is then used to decode the sent encrypted message digest and so yield the original message digest. The random printed marking code data is now hashed to produce a new message digest. Authentication is accomplished when the two message digests at the receiver match.

One can provide other capabilities for detecting fraud and detecting MICR code line errors in check processing, for instance, the MICR line data may (in addition to the pattern data of the taggant) be included in the data which is hashed. A bank may wish to outsort items which do not self-authenticate for further examination—e.g., to correct any MICR reading errors by affixing a MICR correcting strip to enable full machine readability for the remainder of its processing cycle.

Variant Embodiment

In an alternative system, the random printed marking ID (identification) code data (vs message-digest) is printed on the item so that a "digital signature" may be made from it—and this is also printed on the item. The digital signature is then checked for authentication using the public key. If it yields the identical value as the printed form of the random marking code data, then the identity of the private key is authenticated.

Following this, the reading of the physical marking code is compared with the printed value of that code (e.g., on check face) to determine if they are essentially the same. This method is more robust because slight variations in read-out may exist between the first read-out of the random code and a subsequent read-out. That is, while read-out values don't match exactly, they are highly correlated and it is highly unlikely that tampering is involved.

Why use item characteristic?

The reason for using a random physical property of the item (e.g., magnetic. char. on taggant strip) to be authenticated (e.g., magnetic read-out of taggant strip of a check) is to prevent an intelligent counterfeiter from duplicating the read physical properties of a genuine sample and applying the read properties and the associated machine readable codes to copies, thus making identical copies which are authenticatable (e.g., a variable translucency feature of check paper can be another such random physical property).

My invention prefers to use a "magnetic remanence" property, which is the residual coercive force remaining, along the taggant strip, after magnetizing flux has been removed. With a random orientation of small magnetizable (but not yet magnetized) particles of iron oxide in an ink mixture which is then printed, it is impossible to reproduce repeatable patterns of the magnetic remanence variations from one document to any other. Thus, this magnetic remanence variation looks like "noise" when trying to record deliberate magnetic signals on magnetic ink coatings; but this natural property can be exploited to produce an unique ID code; and, once this ID code is read one time, information extracted from it can then be used to determine genuineness the next time that document is read.

To those skilled in the art, other physical properties of small particles will come to mind for use to provide a unique and random ID code. For instance, particles may fluoresce at one detectable wavelength when excited at another. Particles may absorb or reflect electromagnetic energy at certain RF or microwave wavelengths.

I find that ink particles of a certain size may be most effective for producing a large and repeatable random ID code when mixed with ink for printing (usually in the range of 1 to 5 microns). Particles which are too small tend to become homogeneous as they are dispersed in a liquid or paste, whereas "asymmetric particles" (which are wider than they are long or thick) tend to be dispersed in a more noticeably random manner—and this can produce a noise-like signal which is repeatable when making subsequent scans across a printed region.

Normal magnetic ink for printing MICR characters contains iron oxide in about 50 to 70% concentrations by volume in an ink mixture. Deliberately larger magnetic remanence variations may be obtained by using magnetic iron oxide concentrations which are in the range of 20 to 50% or greater than 70% concentration by volume.

Thus, for instance, I prefer to use a one-bit A/D converter with a known magnetic read head to develop an analog read-head output reflecting passage of successive magnetic ink strip areas of different remanence, and convert this to digital signals (e.g., viewed as xx zero-crossings per second)—as workers will understand. Other known methods may be used (e.g., amplitude sensing).

Advantageous use may also be made of this invention in: check printing, transport modification, manufacturers of "authentication modules" (e.g. for use by merchants and banks), and "public-key" certifying entities. Also, those making document processors (transports, etc.) will want to capture data from checks and "self-authenticate" in this fashion; and similarly, for those providing counterfeit detection schemes.

In conclusion, it will be understood that the preferred embodiment(s) described herein are only exemplary, and that the invention is capable of many modifications and variations in construction, arrangement and use without departing from the spirit of the claims. The above examples of possible variations of the present invention are merely illustrative and accordingly, the present invention is to be considered as including all possible modifications and variations coming within the scope of the inventions as defined by the claims appended hereto.

What is claimed is:

1. A method of creating a self-authenticating value document for use in high speed processing, this method comprising, creating a value document for use in high speed processing having a machine readable code line, said machine readable code line reproducing its original code line data when machine read, and a machine readable storage medium for writing clear text data and a digital signature, said clear text and data from said code line data collectively making up a document message, hashing said document message with a hashing algorithm to create a first message digest, signing said first message digest with a private key to create a said digital signature which is then written on said storage medium along with said clear text data.

2. The method of claim 1 in which said document has a taggant containing extractable first tag data, said storage medium has first tag data extracted from said taggant, said first tag data is read from said storage medium, and said first tag data is a part of said document message.

3. The method of claim 1 in which said machine readable code line contains MICR code line data.

4. The method of claim 2 in which said machine readable code line contains MICR code line data.

5. A method of verifying the authenticity of a self-authenticating value document for use in high speed processing, this method comprising, said value document for use in high speed processing having a machine readable code line, said machine readable code line reproducing its original code line data when machine read, a storage medium for writing and reading clear text data and a digital signature, reading said machine readable code line to extract said code line data, reading from said storage medium to extract clear text data and said digital signature, creating a document message from the said extracted clear text data, and said code line data, hashing said document message with a hashing algorithm to create a second message digest, applying a public key to said digital signature to create a first message digest, automatically comparing said first message digest with said second message digest by a computer process to automatically authenticate the holder of the private key and prove the integrity of said machine readable code line and the data read from the said storage medium to provide a first level of security.

6. A method of verifying the authenticity of a self-authenticating value document for use in high speed processing, this method comprising, said value document for use in high speed processing having a machine readable code line, said machine readable code line reproducing its original code line data when machine read, a taggant containing extractable first tag data, and a machine readable storage medium for writing and reading clear text data, said first tag data extracted from said taggant and a digital signature, reading said machine readable code line to extract code line data, reading from said storage medium to extract clear text data, first tag data, and a digital signature, creating a document message from the said extracted clear text data, said first tag data, and said code line data, hashing said document message with a hashing algorithm to create a second message digest, applying a public key to said digital signature to create a first message digest, comparing said first message digest with said second message digest automatically by a computer process to automatically authenticate the holder of the private key and prove the integrity of said machine readable code line and the data read from the said storage medium to provide a first level of security.

7. The method of claim 5 in which said machine readable code line contains MICR code line data.

8. The method of claim 6 in which said machine readable code line contains MICR code line data.

9. The method of claim 6 including the steps of, reading said taggant to extract a second tag data, comparing said second tag data to said first tag data read from said storage medium and determining if the error between said second tag data and said first tag data is within an acceptable limit thus providing a second level of security.

10. The method of claim 9 in which said machine readable code line contains MICR code line data.

11. The method of claim 2 in which said extractable first tag data is magnetic remanence variation data.

12. The method of claim 2 in which said taggant is a magnetic ink taggant.

13. The method of claim 1 in which said machine readable data field contains symbols readable by an Optical Character Recognition (OCR) reader.

14. The method of claim 1 in which said machine readable data field contains symbols readable from an image of a self-authenticating value document.

15. The method of claim 1 in which said machine readable data field is a bar code.

16. The method of claim 1 in which said storage medium is magnetically writeable.

17. The method of claim 1 in which said storage medium is printable on the value document itself.

18. The method of claim 17 in which said document message and said digital signature contained in said storage medium are printed marks.

19. The method of claim 1 including a method of verifying the authenticity of a self-authenticating value document for use in high speed processing, this method comprising, said value document for use in high speed processing having a machine readable code line, said machine readable code line reproducing its original code line data when machine read, and a machine readable storage medium for writing and reading clear text data and a digital signature, reading said machine readable code line to extract said code line data, reading from said storage medium to extract clear text data and a digital signature, creating a document message from the said extracted clear text data and said code line data, hashing said document message with a hashing algorithm to create a second message digest, applying a public key to said digital signature to create a first message digest, automatically comparing said first message digest with said second message digest by a computer process to authenticate the holder of the private key and prove the integrity of said machine readable code line and the data read from the said storage medium to provide a first level of security.

20. The method of claim of claim 1 including a method for verifying the authenticity of a self-authenticating value document for use in high speed processing, this method comprising, said value document for use in high speed processing having a machine readable code line, said machine readable code line reproducing its original code line data when machine read, a taggant containing extractable first tag data, and a machine readable storage medium for writing and reading clear text data, said first tag data extracted from said taggant and a digital signature, reading said machine readable code line to extract said code line data, reading from said storage medium to extract said clear text data, said first tag data, and said digital signature, creating a document message from the said extracted clear text data, said first tag data, and said code line data, hashing said document message with a hashing algorithm to create a second message digest, applying a public key to said digital signature to create a first message digest, automatically comparing said first message digest with said second message digest by a computer process to authenticate the holder of the private key and prove the integrity of said machine readable data field and the data read from the said storage medium to provide a first level of security.

21. The method of claim 20 including the steps of, reading said taggant to extract a second tag data, comparing the second tag data to the first tag data read from the said storage medium and determining if the error between said second tag data and said first tag data is within an acceptable limit thus providing a second level of security.

22. The method of claim 20 in which said extractable first tag data is magnetic remanence variation data.

23. The method of claim 19 in which said machine readable data field is Magnetic Ink Character Recognition (MICR) code.

24. A self-authenticating document, comprising, a value document for use in high speed processing having a machine readable code line, said machine readable code line reproducing its original code line data when machine read, and a machine readable storage medium for writing and reading clear text data, a document message made up of said clear text and data from said code line data, a first message digest created by hashing said document message with a hashing algorithm, a digital signature created by signing said first message digest with a private key, said digital signature written on said storage medium.

25. A self-authenticating value document, comprising, a value document for use in high speed processing having a machine readable code line, a taggant containing extractable first tag data, and a machine readable storage medium for writing and reading clear text data and said first tag data extracted from said taggant, a document message made up of said clear text, first tag data and said code line data extracted from said machine readable code line data, a first message digest created by hashing said document message with a hashing algoritm, a digital signature created by signing said first message digest with a private key, said digital signature written on said storage medium.

26. The method of claim 24 in which said machine readable code line contains MICR code line data.

27. The method of claim 25 in which said machine readable code line contains MICR code line data.

28. The self-authenticating document of claim 25 in which said taggant is a magnetic ink taggant.

29. The self-authenticating document of claim 25 in which said extractable first tag data is a magnetic remanence variation data.

30. Apparatus for verifying the authenticity of a self-authenticating value document for use in high speed processing, comprising, said value document for use in high speed processing having a machine readable code line, said machine readable code line reproducing its original code line data when machine read, and a machine readable storage medium for writing clear text data and a digital signature, means for reading said machine readable code line to extract code line data, means for reading from said storage medium to extract clear text data and a digital signature, means for creating a document message from the said extracted clear text data and said code line data, a hashing algorithm to hash said document message to create a second message digest, applying a public key to said digital signature to create a first message digest, means for automatically comparing said first message digest with said second message digest by a computer process to authenticate the holder of the private key and prove the integrity of said machine readable code line code line and the data read from the said storage medium to provide a first level of security.

31. Apparatus for verifying the authenticity of a self-authenticating value document for use in high speed processing, comprising, said value document for use in high speed processing having a machine readable code line, said machine readable code line reproducing its original code line data when machine read, a taggant containing extractable first tag data, and a machine readable storage medium for writing and reading clear text data, said first tag data extracted from said taggant and a digital signature, means for reading said machine readable code line to extract said code line data, means for reading from said storage medium to extract clear text data, first tag data, and a digital signature, means for creating a document message from the said extracted clear text data, said first tag data, and said code line data, a hashing algorithm to hash said document message to create a second message digest, applying a known verification algorithm to said digital signature using a public key to create a first message digest, means for automatically comparing said first message digest with said second message digest by a computer process to authenticate the holder of the private key and prove the integrity of said machine readable code line and the data read from the said storage medium to provide a first level of security.

32. The method of claim 30 in which said machine readable code line contains MICR code line data.

33. The method of claim 31 in which said machine readable code line contains MICR code line data.

34. The apparatus of claim 31 comprising, means for reading said taggant to extract a second tag data, means for comparing the second tag data to the first tag data read from the said storage medium and determining if the error between said second tag data and said first tag data is within an acceptable limit thus providing a second level of security.

35. Apparatus for creating a self-authenticating value document for use in high speed processing at a sender site and for verifying the authenticity of said self-authenticating value document for use in high speed processing at a receiver site, comprising, said apparatus for creating a self-authenticating value document for use in high speed processing at a sender site including, a value document for use in high speed processing having a machine readable code line, said machine readable code line reproducing its original code line data when machine read, and a machine readable storage medium for writing and reading clear text data, a document message made up of said clear text and data from said code line data, a first message digest created by hashing said document message with a hashing algorithm, a digital signature created by signing said first message digest with a private key, said digital signature written on said storage medium, said apparatus for verifying the authenticity of said self-authenticating value document for use in high speed processing at said receiver site including, said document having a machine readable code line, and a storage medium for writing and reading clear text data and a digital signature, means for reading said machine readable code line to extract said code data, means for reading from said storage medium to extract clear text data and a digital signature, means for creating a document message from the said extracted clear text data and said code line data, a hashing algorithm to hash said document message to create a second message digest, applying a known verification algorithm to said digital signature using a public key to create a first message digest, means for automatically comparing said first message digest with said second message digest by a computer process to authenticate the holder of the private key and prove the integrity of said machine readable data field and the data read from the said storage medium to provide a first level of security.

36. Apparatus for creating a self-authenticating value document for use in high speed processing at a sender site and for verifying the authenticity of said self-authenticating value document for use in high speed processing at a receiver site, comprising, said apparatus for creating a self-authenticating value document for use in high speed processing at a sender site including, a value document for use in high speed processing having a machine readable code line, said machine readable code line reproducing its original code line data when machine read, a taggant containing extractable first tag data, and a machine readable storage medium for writing and reading clear text data, and said first tag data extracted from said taggant, a document message made up of said clear text, first tag data and said code line data extracted from said machine readable code line, a first message digest created by hashing said document message with a hashing algorithm, a digital signature created by signing said first message digest with a private key, said digital signature written on said storage medium, said apparatus for verifying the authenticity of said self-authenticating value document for use in high speed processing at said receiver site including, said document having a machine readable code line, a taggant containing extractable first tag data, and a storage medium for writing and reading clear text data, said first tag data extracted from said taggant and a digital signature, means for reading said machine readable code line to extract said code line data, means for reading from said storage medium to extract said clear text data, said first tag data, and said digital signature, means for creating a document message from the said extracted clear text data, said first tag data, and said code line data, a hashing algorithm to hash said document message to create a second message digest, applying a known verification algorithm to said digital signature using a public key to create a first message digest, means for automatically comparing said first message digest with said second message digest by a computer process to authenticate the holder of the private key and prove the integrity of said machine readable data field and the data read from the said storage medium to provide a first level of security.

37. The method of claim 35 in which said machine readable code line contains MICR code line data.

38. The method of claim 36 in which said machine readable code line contains MICR code line data.

39. The apparatus of claim 38 comprising, means for reading said taggant to extract a second tag data, means for comparing the second tag data to the first tag data read from the said storage medium and determining if the error between said second tag data and said first tag data is within an acceptable limit thus providing a second level of security.

40. The self-authenticating value document of claim 35 in which said taggant is a magnetic ink taggant.

41. The self-authenticating value document of claim 35 in which said extractable first tag data is a magnetic remanence variation data.

* * * * *